United States Patent [19]

Keller

[11] Patent Number: 4,493,985
[45] Date of Patent: Jan. 15, 1985

[54] WELDING SLEEVE

[75] Inventor: Hans Keller, Riehen, Switzerland

[73] Assignee: Geberit A.G., Jona, Switzerland

[21] Appl. No.: 489,253

[22] Filed: Apr. 27, 1983

[30] Foreign Application Priority Data

May 12, 1982 [CH] Switzerland .................... 2948/82

[51] Int. Cl.³ .............................................. H05B 3/58
[52] U.S. Cl. .................................. 219/535; 219/517;
219/528; 219/544; 219/541; 156/274.2;
264/272.11; 285/286
[58] Field of Search ............... 219/212, 516, 517, 523,
219/535, 528, 541, 544, 549; 174/84 S;
156/272.2, 275, 304.2, 380, 279.7, 274.2, 379.7;
285/22, 286; 338/215, 226; 425/406; 264/230,
272.11

[56] References Cited

U.S. PATENT DOCUMENTS

| | | | |
|---|---|---|---|
| 2,254,330 | 9/1941 | Stiebel | 219/517 X |
| 2,845,519 | 7/1958 | Willat | 219/517 X |
| 3,378,672 | 4/1968 | Blumenkrantz | 219/544 X |
| 3,423,567 | 1/1969 | Mills | 219/212 |
| 3,506,519 | 4/1970 | Blumenkrantz | 156/275 |
| 3,717,793 | 2/1973 | Peterson | 219/517 X |
| 3,904,850 | 9/1975 | Johnson | 219/528 |
| 4,006,443 | 2/1977 | Kouchich et al. | 338/215 |
| 4,025,755 | 5/1977 | Shirley | 219/549 |
| 4,117,311 | 9/1978 | Sturm | 219/544 |
| 4,147,926 | 4/1979 | Stahli | 219/535 |
| 4,328,387 | 5/1982 | Kemble | 219/517 |
| 4,390,776 | 6/1983 | Yane et al. | 219/523 |
| 4,419,569 | 12/1983 | Coltin | 219/528 |

Primary Examiner—Volodymyr Y. Mayewsky
Attorney, Agent, or Firm—Toren, McGeady and Stanger

[57] ABSTRACT

A welding sleeve for connecting pipes formed of thermoplastic material includes an electrical conductor in the form of an electrical resistance wire. The resistance wire extends around the sleeve and has a pair of opposite ends for conveying current through the wire. The opposite ends of the wires can be connected directly to a source of electrical current, for instance a 220° V~line. It is not necessary to provide transformers or timing relays. A melting material is incorporated into the conductor between its ends and it melts through when the energy necessary for welding the sleeve has been developed. After the current is supplied through the resistance wire, the welding process is completed when the predetermined melting material melts through. Such sleeves can be manufactured in a mass production operation, and the sleeves are much safer than the conventional devices used to-date.

11 Claims, 3 Drawing Figures

WELDING SLEEVE

SUMMARY OF THE INVENTION

Welding sleeves including an inserted conductor for the connection of thermoplastic material pipes are known, where the conductor is at least partially made up of a resistance heating wire. Such sleeves usually are formed of the same material as the pipes to which they are welded, whether they are constructed as conventional sleeves for the production of a permanent connection between two pipes or are provided at one side with a thread and thus form fittings providing the pipe end onto which they are welded with a thread. In carrying out the welding operation, specially constructed control devices are used so that the voltage applied to the resistance heating wire and the duration of the heating process can be set. Such devices must be available at any construction site at which the welding sleeves are used, and usually at large construction sites where several workers are needed for the connection of the thermoplastic pipes, several devices are required even though the devices may not be used for days at a time. As a consequence, such devices involve a considerable investment and there is the known disadvantage that such devices may be damaged at a construction site or they might become lost or even stolen. An operator can set the time period for the flow of current required for the welding process and in addition also set the necessary voltage, however, there is the possibility that if these values are set incorrectly, it could lead to errors in the welded connection. These various disadvantages can be prevented by utilizing the welding sleeve embodying the present invention which is characterized in that the conductor includes a predetermined melting material sized so that it melts approximately at the time when the energy supplied through the heating conductor, required for the welding of the sleeve, has been developed. It is only necessary to assure that the sleeve manufacturer attaches a notice about the voltage to be utilized. Where such a device is employed in Europe generally 220° V~ is used, since such a voltage is available at all construction sites. In accordance with the present invention, the only auxiliary means needed is a two-conductor cable with a plug for the 220° V~, a suspension switch, and a plug device which can be connected to the conductor and, as a result, no operational errors should occur and the cost and the danger of improper welding are significantly smaller than in the use of the control devices which have been employed to-date.

The various features of novelty which characterize the invention are pointed out with particularity in the claims annexed to and forming a part of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
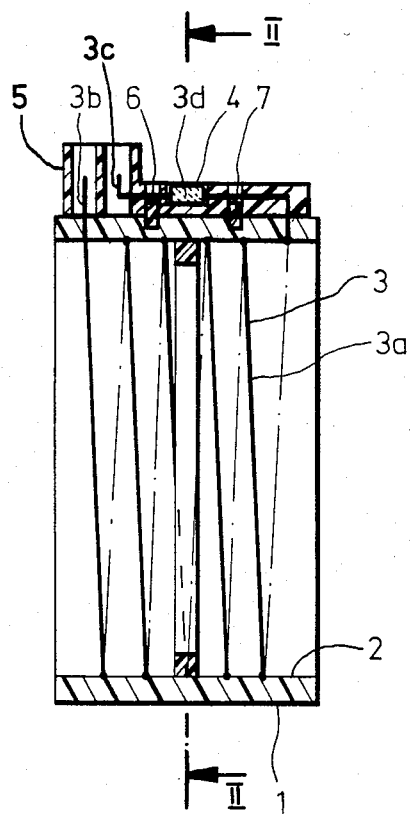
FIG. 1 is an axially extending sectional view through a welding sleeve embodying the present invention.

If the drawing a cylindrical sleeve member 1 has an inside surface 2 in which a number of windings 3a of a resistance heating wire 3 are inserted in a known manner. The heating wire 3 has a pair of opposite ends 3b, 3c.

As can be seen in FIG. 1, the windings 3a extend in the axial direction of the sleeve and the ends 3b, 3c are located both at one end of the windings, that is, the left end as viewed in FIG. 1.

Figure 2:
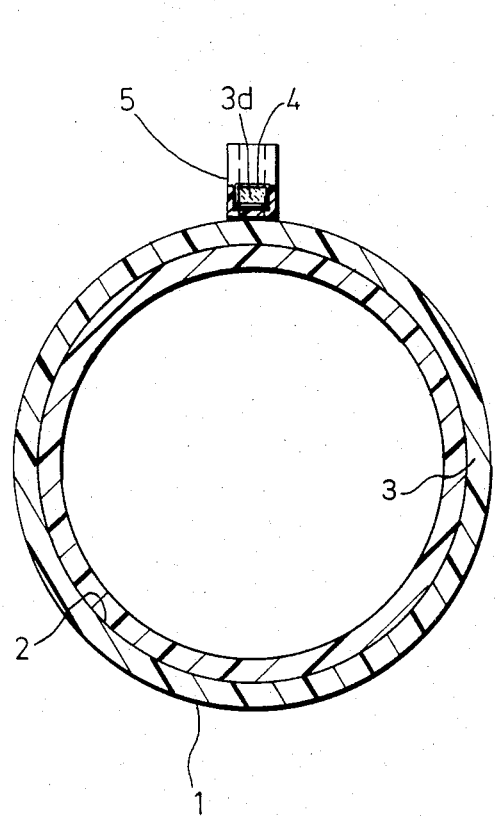
FIG. 2 is a cross-sectional view taken along line II—II in FIG. 1.
Figure 2A:
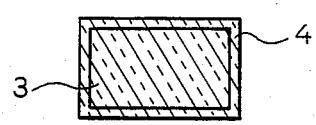

For purposes of description, the end of the windings spaced from the ends 3b, 3c is the first end and the opposite end containing the ends or connections 3b, 3c is the second end. Between the first end and second end of the windings 3a, a predetermined melting material 3d is provided in the electrical conductor or heating wire 3 and it is sized so that it melts when the energy required for welding the sleeve, depending on the size of the sleeve, has been developed. The elapsed time to develop the required energy may be in the range of 0.5 to 5 minutes or under certain circumstances it may be even longer at the applied voltage of 220 V~. As shown in FIGS. 1 and 2, the melting material 3d is installed in a glass ampoule 4. It would also be possible to enclose the melting material in a preferably transparent, plastic shell. Further, it is advantageous if the melting material is at least partially surrounded with a second material which changes color irreversibly when the melting operation has been completed. It is also possible to provide the predetermined melting material 3d, when it has been melted through, as an easily visible deposit at the inside of the protective shield. Accordingly, it is easily possible to determine whether the welding process has been completed or not.

In the illustrated embodiment, the predetermined melting material 3d, protected by the ampoule 4, is mounted in a support 5 which also mounts the two ends 3b, 3c of the heating conductor or resistance heating wire 3. The support 5 is connected to the welding sleeve only by two plastic pins or studs 6, 7, so that the entire support can be removed from the sleeve after the welding operation has been completed.

While specific embodiments of the invention have been shown and described in detail to illustrate the application of the inventive principles, it will be understood that the invention may be embodied otherwise without departing from such principles.

I claim:

1. A welding sleeve for connecting pipes formed of thermoplastic material comprising an axially extending sleeve member having an inner surface and an outer surface with the inner surface arranged to contact the pipes to be connected, an electrical conductor is located in said sleeve member in the form of a resistance heating wire having a pair of opposite ends, said opposite ends arranged for conveying current through said heating wire, said resistance heating wire is arranged in said sleeve member for heating the inner surface of said sleeve for transmitting the heat to the pipes to be connected, characterized in that said resistance heating wire includes a predetermined melting material located between the opposite ends of said resistance heating wire so that said material melts through approximately when the heat energy required for welding said sleeve to the pipes to be connected has been developed and causes the termination of the flow of current through said electrical conductor and thereby the discontinuance of heating said sleeve by said resistance heating wire.

2. A welding sleeve, as set forth in claim 1, wherein said predetermined melting material is arranged so that it is visible on the outer surface of said sleeve.

3. A welding sleeve, as set forth in claim 2, wherein a transparent material encloses said predetermined melting material in the outer surface of said sleeve.

4. A welding sleeve, as set forth in claim 2, wherein a second material which changes color irreversibly when said predetermined melting material is completely melted surrounds said melting material.

5. A welding sleeve, as set forth in claim 3, wherein a second material which changes color irreversibly when said predetermined melting material is completely melted surrounds said melting material.

6. A welding sleeve, as set forth in claim 1, including a plastic support located on the outer surface of said welding sleeve, said plastic support is detachably secured to said welding sleeve, and said predetermined melting material is mounted in said plastic support.

7. A welding sleeve, as set forth in claim 2, including a plastic support located on the outer surface of said welding sleeve, said plastic support is detachably secured to said welding sleeve, and said predetermined melting material is mounted in said plastic support.

8. A welding sleeve as set forth in claim 3, including a plastic support located on the outer surface of said welding sleeve, said plastic support is detachably secured to said welding sleeve, and said predetermined melting material is mounted in said plastic support.

9. A welding sleeve, as set forth in claim 4, including a plastic support located on the outer surface of said welding sleeve, said plastic support is detachably secured to said welding sleeve, and said predetermined melting material is mounted in said plastic support.

10. A welding sleeve, as set forth in claim 5, including a plastic support located on the outer surface of said welding sleeve, said plastic support is detachably secured to said welding sleeve, and said predetermined melting material is mounted in said plastic support.

11. A welding sleeve, as set forth in claim 1, wherein said welding sleeve has a first end and a second end, said resistance heating wire is made up of a number of coils located with said welding sleeve and extending around and adjacent to the inner surface of said sleeve member, said coils arranged in series one following the other with one end of said coils located closer to the first end of said sleeve and the other end of said coils located closer to the second end of said sleeve.

* * * * *